United States Patent [19]

Segal

[11] 3,709,378

[45] Jan. 9, 1973

[54] ALIGNING AND ORIENTING APPARATUS

[75] Inventor: Zvi Segal, Wappingers Falls, N.Y.

[73] Assignee: International Business Machines Corporation, Armonk, N.Y.

[22] Filed: March 4, 1971

[21] Appl. No.: 121,096

[52] U.S. Cl. ................................214/1 Q, 198/33 AB

[51] Int. Cl. ................................................B65g 7/00

[58] Field of Search.214/1 QG, 1 Q; 198/33 R, 33 AB

[56] References Cited

UNITED STATES PATENTS

| | | | |
|---|---|---|---|
| 3,313,395 | 4/1967 | DeTurris et al. | 198/33 AB |
| 3,367,476 | 2/1968 | Aronstein et al. | 198/33 AB |

FOREIGN PATENTS OR APPLICATIONS

| | | | |
|---|---|---|---|
| 951,740 | 3/1964 | Great Britain | 214/1 Q |

*Primary Examiner*—Drayton E. Hoffman
*Assistant Examiner*—Frank E. Werner
*Attorney*—Hanifin & Jancin and John F. Osterndorf

[57] ABSTRACT

Aligning and orienting apparatus for semiconductor chip handling apparatus. The aligner and orienter are positioned at one of the handling apparatus stations coacting with an indexable vacuum pencil spider assembly. The pencils under pneumatic control pick up semiconductor chips from bowls and transport them to the aligning and orienting station and then for subsequent handling such as testing and sorting based on the test results. Aligning and orienting is performed by activatable arms carrying aligners at corresponding coacting ends acting on the surfaces of the chip.

5 Claims, 10 Drawing Figures

INVENTOR
ZVI SEGAL
BY John F. Ostendorf
ATTORNEY

ALIGNING AND ORIENTING APPARATUS

BACKGROUND OF THE INVENTION

1. Field of the Invention

This invention relates to aligning and orienting apparatus and, more particularly, to apparatus for aligning and orienting semiconductor articles preliminary to the performance of multiple processing steps occurring at circumferentially spaced stations of handling apparatus.

2. Description of the Prior Art

As the complexity of integrated circuit devices has increased, the number of individual circuits contained within a single semiconductor package and the task of handling and testing such a circuit package have similarly become more complex. Testing equipment and systems now perform static and dynamic tests on integrated packages using functional testers and complex and often computer controlled testing systems.

The evolution of the test equipment and systems has witnessed the enhancement of the operating speeds of the test equipment as considerably more tests are performed on these more complex circuit packages in shorter periods of time. More of the test operation has been automated to increase the speed of the testing operation. As a part of this automation, significant advances have occurred in the area of handling apparatus.

In application Ser. No. 889,382 filed Dec. 31, 1969, now U.S. Pat. No. 3,616,942 in the name of L. W. Gruber, entitled "Selective Chip Pickup Apparatus for Multiple Feed Bowls" and assigned to the same assignee as the assignee of this invention, there is described a mechanical and pneumatic semiconductor chip pickup apparatus for selectively transporting minute semiconductor chips having substantial numbers of circuits between circumferentially spaced stations for subjecting the chips to multiple processing steps. Vacuum pencils are carried by an indexable, rotatable and depressible pencil arm spider assembly. The pencil arms selectively pick up chips from multiple vibrating feed bowls and transport them to stations for testing and subsequent sorting based on the results of the tests.

As presently performed, aligning of the chips occurs only in the individual bowls prior to their pick up. An end stop determines the location of the chip in the X direction and the position of the bowl itself locates the chip in the Y direction. The position of the end stop with respect to the bowl is of importance in maintaining the proper angular position of the chips. Thus, to assure proper positioning on a testing contactor located at a subsequent coacting station for the spider assembly in a four bowl pickup assembly, a total of eight adjustments must be controlled. As is readily apparent, it is extremely difficult to control all of these adjustments particularly when the effects of chip bouncing at the end stops are taken into consideration. In such arrangements, the vibratory speed of the bowls lags the speed of the spider arm assembly so that pickup occurs prior to the complete alignment and orientation of a chip in the bowl thereby causing positional inaccuracies.

The probability of inaccuracy occurring from the need to maintain so many individual adjustments within extremely rigid tolerances is extremely high. The net result has been a low contacting efficiency at the subsequent testing stations requiring that there be multiple runs of the same job lot of chips through the handling apparatus in order to properly complete a testing operation. In the alternative, time consuming readjustments of the apparatus are required substantially reducing the available apparatus time.

SUMMARY OF THE INVENTION

To obviate the inaccuracies and deficiencies of the present aligning arrangement in the feed bowls of the chip handling apparatus, this invention adds an aligning and orienting apparatus stage to the handling apparatus. After pickup of the chips from the bowls by the vacuum pencils, every chip is passed through this aligning and orienting stage prior to being transported to a contactor station for testing. The apparatus is located at a station between the pickup stations and the contactor stations and is formed of a pair of arms adjustable in the X and Y directions to provide alignment of the apparatus. Each arm has one end pivotable about a common point and normally displaced at the other ends to define a gap greater than the dimensions of the semiconductor chip. In response to excitation, the arms are activated and caused to be attracted toward each other. The size of the gap between them is reduced to that approximating the dimensions of the chip.

One of the arms carries a rigid V-shaped member for orienting the chip and the other arm spring elements in the form of a V to urge the chip into the rigid member while the chip is carried by vacuum on a pencil arm. On removal of the excitation, the chip is oriented and aligned and ready for transport to the next station on indexing of the handling apparatus.

According to one feature of the invention, the V-shaped members are attracted toward each other by a magnetic field while their other ends pivot about the common point. Adjusting set screws limit the extent of the excursion of the arms and thus define the limits of the gap between them. The V-shaped ends of the arms coact with the body of a chip causing the chip to be seated between the two V's and therefore correctly aligned and oriented. The arms are individually activatable and the excitation may be removed on both concurrently or in sequence. When the excitation is removed, return springs pull the arms back to their normal positions.

According to another feature of the invention, operation is substantially the same as in the one feature, except that the arm having the rigid member carries a platform projecting from a portion of the member for positioning below the contact pads of the chips. A locating wall is defined at the junction of the member and platform which coacts with these pads while the other arm coacts with the surface of the chip. By using this embodiment, errors are eliminated that are due to tolerance considerations on the dimensions of the chip occurring during dicing operations and on the positioning of the contact pads relative to the surface of the chip. In this embodiment, aligning is performed off the pads of the chip.

DESCRIPTION OF THE PREFERRED EMBODIMENTS

Figures 1, 2:
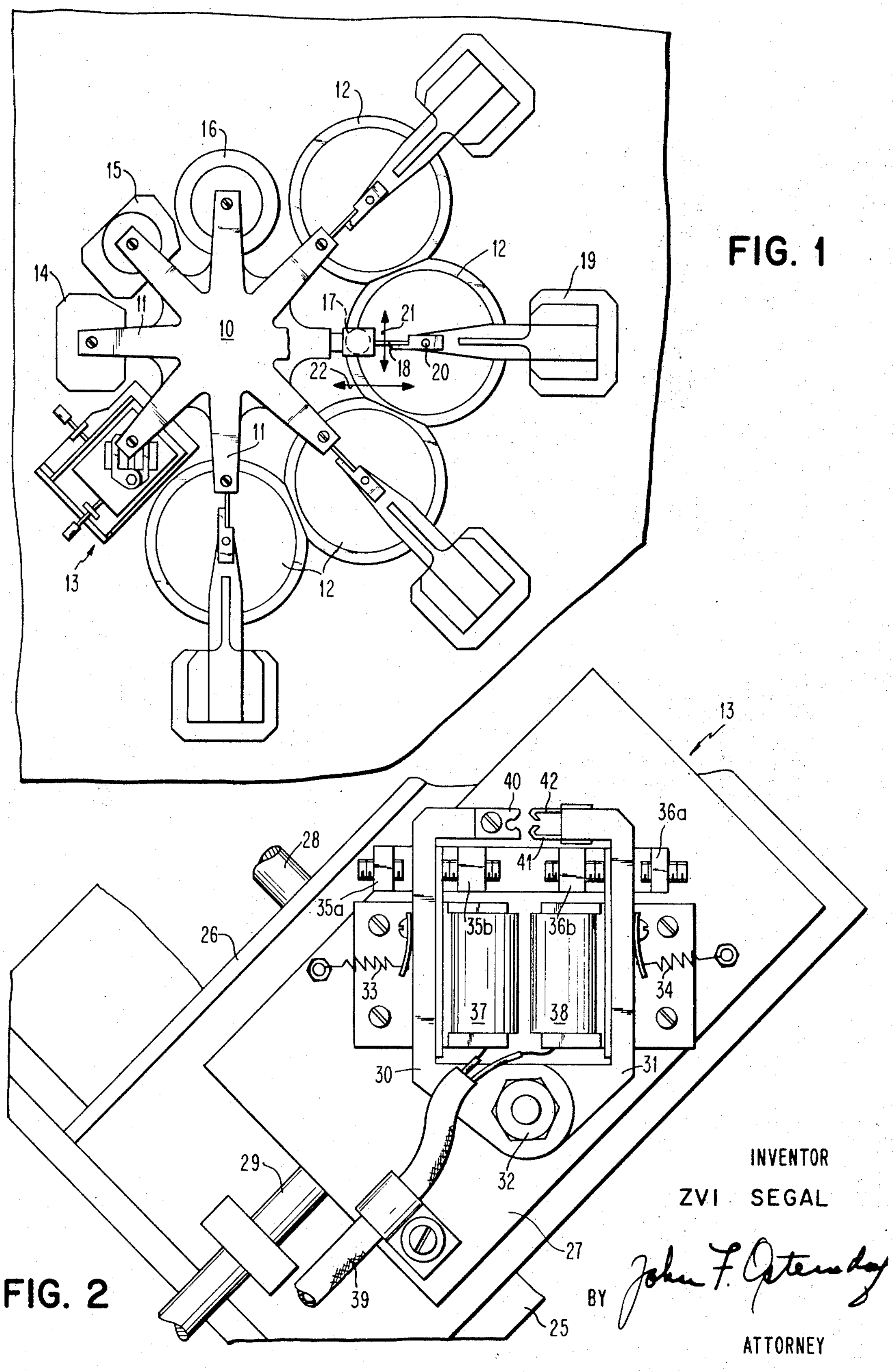
FIG. 1 is a schematic top view of the handling apparatus including the spider arm assembly.
FIG. 2 is a top view of the orienting and aligning apparatus located at one of the stations of the handling apparatus.

As already stated, the selective chip pickup apparatus from a plurality of vibratory feed bowls is described in detail in the aforementioned application Ser. No. 889,382. For purposes of this description, this apparatus includes a spider arm assembly 10 having a plurality of arms 11 radially extending outwardly from the hub of the assembly. As is described in the aforecited application, the spider arm assembly is indexable so that the individual arms 11 coact at a plurality of fixed stations. At the first four stations, feed bowls 12 have semiconductor chips loaded in bulk in them. Following the feed bowls, there is provided an aligning station 13, which is the subject of this invention, a device presence sensing station 14, a testing station 15 and a sorting station 16.

Each of the arms 11 of spider assembly 10 also contains a vacuum pencil which is depressible in an axial direction. The pencil arms at 17 pick up chips from bowls 12 and by means of the vacuum applied through the pencils transport them from station to station. Each of the bowls 12 has an end stop 18 associated with it which is rigidly held at the end 19. Angular adjustment of end stop 18 is provided for at 20. The chip is aligned in the X direction 21 by end stop 18 and in the Y direction 22 by the position of the bowl. As stated in the preliminary portion of this specification, this alignment in the bowl is at best a coarse alignment and not satisfactory for the contacting that must be made to the pads of a chip at testing station 15.

In FIG. 2, aligning and orienting apparatus 13 is depicted in greater detail. The aligning and orienting apparatus includes a base 25, an X stage 26 and a Y stage 27. Through adjusting screws 28, 29, adjustments are made for the aligning and orienting apparatus. Mounted on Y stage 27 are arms 30, 31 which are generally U-shaped. Arms 30, 31 pivot at one end each about a common point or location by means of bolt and nut assembly 32. The other ends of arms 30, 31 include the aligning and orienting elements of the apparatus.

As shown in FIG. 2, arms 30 and 31 are in an activated state, exerting tension on pull back springs 33, 34. The excursion of the arms is defined by pairs of stops **35*a*–35*b*, 36*a*–36*b*. Excitation of the arms is independently effected by electromagnetic coils 37, 38 which are suitably activated through connector 39 to a source of electrical potential. When the coils are energized, a magnetic field is set up between the armatures of the coils and arms 30, 31 causing the arms to rotate about pivot point 32 until they are attracted toward one another and engage stops 35*b*, 36*b*. In the deenergized or normal position of the arms, they contact stops 35*a*, 36*a* and no tension is exerted on return springs 33, 34. Although the apparatus of the invention has been described as employing two arms pivotable about common point, it is readily apparent that one arm could be held in a fixed position and the other be displaceable when energized. Preferably, in such an arrangement, arm 30 would be fixed in the activated position of FIG. 2 and arm 31 would pivot about assembly 32**.

At the end of arm 30, there is provided a generally V-shaped locating surface 40 of rigid material with the contacting surfaces made of a material such as carbide to absorb the effects of repeated chip contact. At the end of arm 31, there are mounted two individual flexible springs 41, 42 which may be coated with an abrasive resistant material to prevent wear.

Figure 3A:
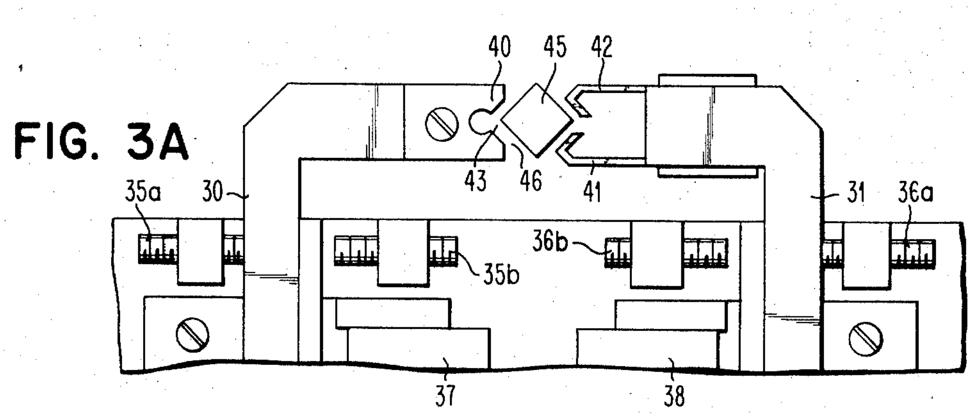
FIGS. 3A–3C are schematic top views of the various steps in aligning and orienting a chip according to one embodiment of the invention.
Figure 3B:
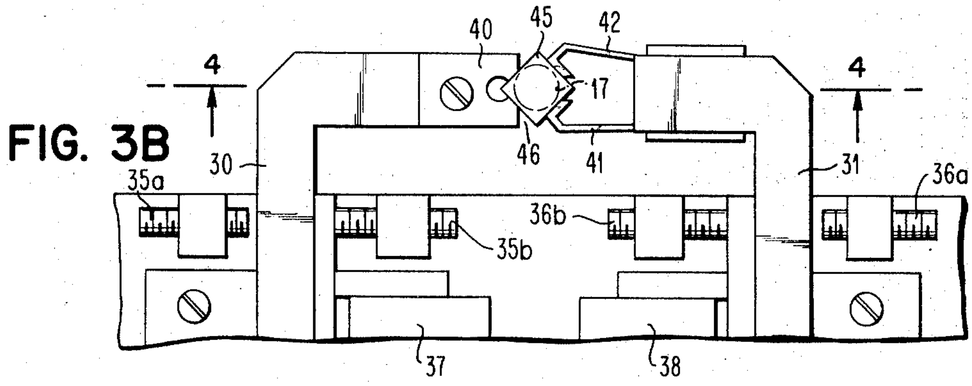
Figure 3C:
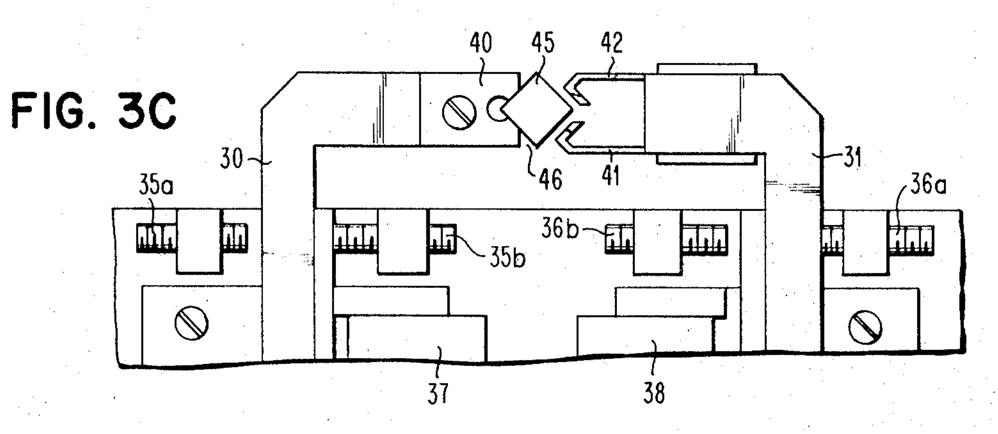

As shown in FIG. 3A, a semiconductor chip 45 having a substantially square or rectangular shape and carried by vacuum pencil (not shown), is located in the gap 46 between rigid element 40 and springs 41, 42. Arms 30, 31 contact, respectively, stops **35*a*, 36*a*. After coils 37, 38 are energized (FIG. 3B), the arms 30, 31 are attracted toward each other and against stops 35*b*, 36*b*. Gap 46 is reduced in size and chip 45 is located against member 40 of arm 30. Flexible springs 41, 42 urge chip 45 into the V-shaped aperture 43 of member 40. After the chip is aligned and oriented (orienting taking place through less than 90° when necessary), coil 38 is deenergized and due to the action of spring 34, is pulled back against stop 36*a* as shown in FIG. 3C. Shortly thereafter, coil 37 is deenergized and in turn spring 33 pulls arm 30 back to its normal position against stop 35*a*** as shown in FIG. 3A. The alignment of the chip is completed and with the vacuum pencil arm being lifted, the chip is removed from the aligning station and indexed to the subsequent stations as shown in FIG. 1.

Figure 4:
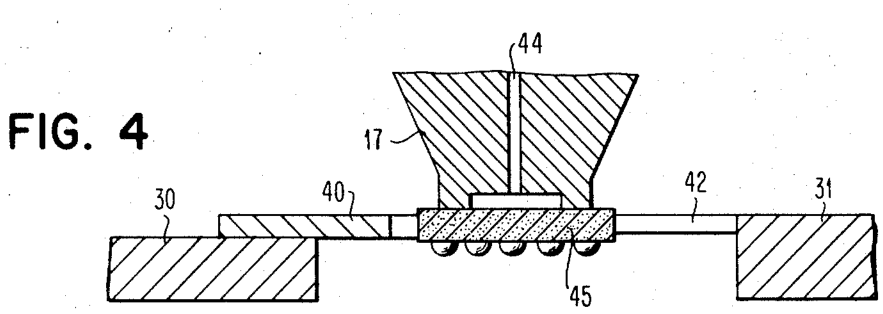
FIG. 4 is a view partially in section of the embodiment of FIG. 3 taken along the line 4—4.

As shown in FIG. 4, alignment of chip 45 takes place on the side surfaces of the chip by urging it between member 40 and the springs such as at 42. The vacuum pencil head 17 has vacuum applied through opening 44 to retain chip 45 by a suction force while aligning and orienting occurs. With the suction force applied, chip 45 is able to slide across the contacting surface of head 17.

Figure 5A:
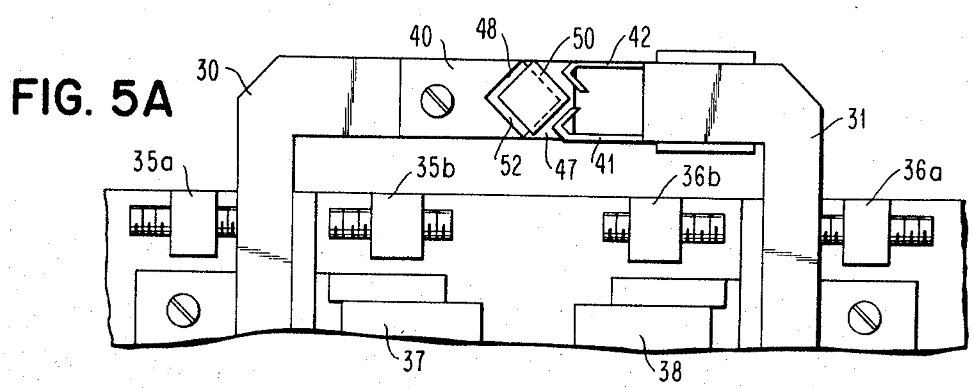
FIGS. 5A–5C are schematic top views of the various steps in aligning and orienting a chip according to another embodiment of the invention.
Figure 5B:
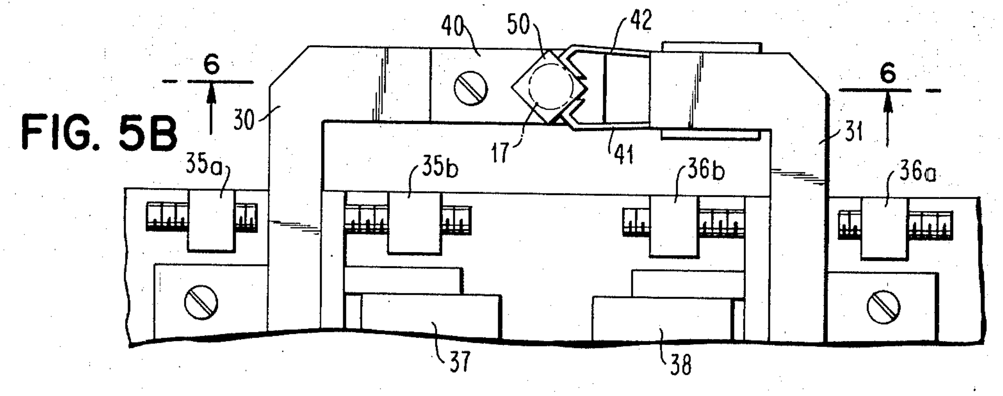
Figure 5C:
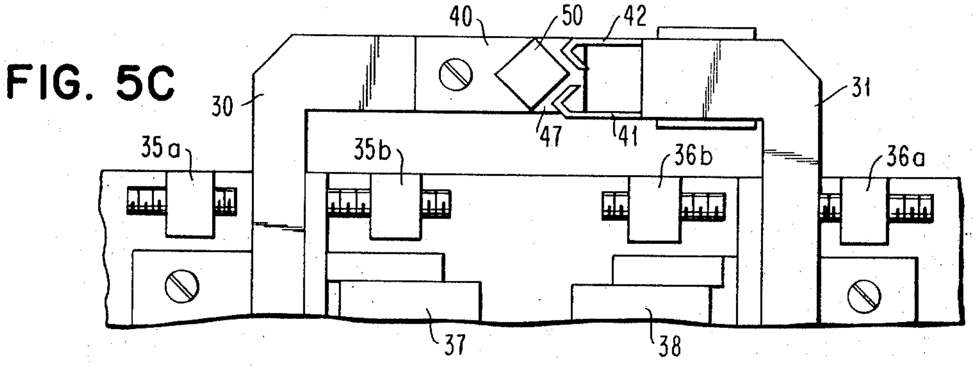
Figure 6:
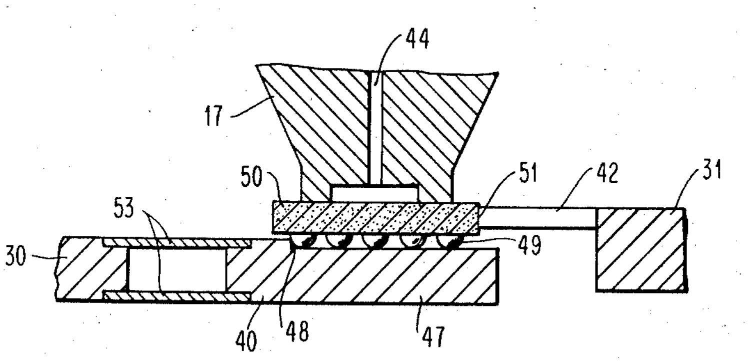
FIG. 6 is a view partially in section of the embodiment of FIG. 5 taken along the line 6—6.

As shown in FIGS. 5A–5C, the aligning apparatus is substantially the same as that described with respect to FIGS. 3 and 4. However, as shown more particularly in FIG. 6, arm 30, through cantilever springs 53, carries a platform 47 extending from a portion of rigid member 40. Springs 53 are provided to accommodate any vertical misalignment when the chip is lowered onto platform 47 and also to provide the proper sliding force between the chip and platform 47. Platform 47 defines an edge 48 with member 40 at which pads 49 of chip 50 are aligned. Flexible springs 41, 42 extend from arm 31 in the same manner as with the embodiment of FIGS. 3 and 4, engaging the side wall 51 of chip 50. Platform 47 is also made flexible by mounting it to arm 30 by parallel springs 53.

The operation of the aligning and orienting apparatus is substantially the same. In FIG. 5A, both of the coils 37, 38 are deenergized and arms 30, 31 contact stops **35*a*, 36*a*. Chip 50** carried by a vacuum pencil rests on platform 47. In FIG. 5B, both coils 37, 38 are energized and the chip 50 is aligned at locating wall 48 in V-opening 52. Springs 41, 42 urge chip 50 into opening 52. This causes a sliding motion on platform 47 relative to vacuum pencil 17 until the pads hit the locating walls 48 of opening 52. In FIG. 5C, coil 38 is deenergized and due to the action of spring 34, arm 31 is retracted. After arm 31 is retracted, the chip is then lifted from the aligning and orienting station to the subsequent processing stations as shown in FIG. 1, by means of vacuum pencil 17. Subsequently, coil 37 is deenergized and arm 30 is retracted. When the arms are released in sequence rather than concurrently, any misalignment due to the restoring motion of the elastically deformed flexible springs is eliminated.

By aligning on pads 49 of chip 50 rather than on the outside walls of the chip body, errors in the tolerances occurring in the body of the chip due to dicing operations are obviated. This eliminates dicing error as a factor in misalignment between the pads 49 and the contactor blades at testing station 15 of FIG. 1.

When the aligning and orienting apparatus is employed in the handling apparatus of FIG. 1, the aligner is positioned two stations away from the testing station 15 to eliminate an additional error. The handling apparatus employs a parallel cam indexer mechanism consisting of two cams which alternatively index the head from one station to another. The accuracy of indexing is a function of the accuracy of the two cams. When the aligning and orienting station is located two stations away from the testing contactor station, the same cam that indexes the chip into the aligning station indexes the chip into the contactor station and any inaccuracies due to the indexer are eliminated by the use of the aligner.

It is readily apparent that the aligning and orienting apparatus of the invention may be employed with other equipment than a tester. It may be employed wherever accuracy of alignment and orientation of a semiconductor chip is necessary. Such an application would be in positioning chips on a substrate.

While this invention has been particularly described with reference to the preferred embodiments thereof, it will be understood by those skilled in the art that the foregoing and other changes in form and detail may be made therein without departing from the spirit and scope of the invention.

What is claimed is:

1. In article handling apparatus in which articles are transported from station to station by carrying means, apparatus at one of said stations for aligning said articles, comprising a pair of arms with one end of each of said arms secured at a common location and with at least one of said arms being pivotable about said location within defined limits, said arms being normally disposed at the other ends to define a gap greater than the dimensions of one of said articles, means at the other ends of said arms for contacting the surfaces of an article transported into said gap to align and orient the article into a predetermined position when said pivotable arm is activated, said means at the other ends of said arms are formed for one of said arms as a rigid V-shaped member with the V surfaces of said member contacting a portion of said article to align it and for the other of said arms as a pair of flexible deformable springs formed in a V-shape contacting a surface of said article on a side of said article opposite to that contacted by the rigid member, and means for activating said pivotable arm to reduce said gap and contact said surfaces by urging said article between said aligning means thereby locating said article in the predetermined position.

2. In the apparatus of claim 1, wherein both of said arms are pivotable about one end each and said activating means comprises first and second arm exciters independently activated for controlling the pivoting of said arms within defined limits.

3. In the apparatus of claim 1, wherein the rigid member has a platform portion extending from a portion of the contacting face of said member, whereby as said article is aligned and oriented it is positioned on said platform.

4. Aligning and orienting apparatus for semiconductor chips having contactor pads extending from one surface thereof, comprising a pair of arms, each of said arms having an end pivotable within defined limits about a common location and normally disposed at the other ends when deactivated to define a gap greater than the dimensions of one of said chips, means at the other ends of said arms for contacting portions of a chip provided to said gap to align and orient the chip when said arms are activated, said means comprising for one of said arms a rigid V-shaped member with the V surfaces of said member contacting a portion of said chip to align it and for the other of said arms a pair of flexible deformable springs formed in a V-shape contacting surfaces of said chip on a side opposite to those contacted by the rigid member, and means for independently activating said arms to reduce said gap whereby said means at other ends of said arms are urged against respective portions of said chip to align and orient it to a predetermined position.

5. The apparatus of claim 4, wherein the rigid member has a platform portion extending from a portion of the contacting face of said member so as to define a locating face between said platform portion and rigid member whereby as said chip having its pads positioned on said platform is acted on by said apparatus, the pads are aligned and oriented at said locating face and the body of said chip is acted on by said springs.

* * * * *